Patented July 12, 1927.

1,635,635

UNITED STATES PATENT OFFICE.

EARL B. PUTT, OF NEW YORK, N. Y.

DENATURED ETHYL-ALCOHOL COMPOSITION.

No Drawing. Application filed November 1, 1926. Serial No. 145,704.

This invention relates to a denatured ethyl alcohol composition wherein, in its preferred embodiment, there is employed a denaturant of any suitable or approved character and a terpin, preferably terpin hydrate, the composition having the characteristic that if such denaturant is removed therefrom as by distillation at atmospheric pressure the resulting distillate will have the distinctive odor and taste of terpin decomposition products.

Heretofore, various denaturants have been added to ethyl alcohol for the purpose of rendering such alcohol unfit for beverage use. Though many such substances are suitable, on account of poisonous or otherwise obnoxious characteristics, for this purpose, such denaturants can usually be removed by special treatment of the denatured alcohol and the recovered alcohol sold as pure alcohol. These special treatments in general may be either a process of fractional or direct distillation, dilution with water and subsequent distillation, addition of acid or alkali followed by distillation, or washing the denatured alcohol direct with an immiscible solvent such as mineral oil to remove the denaturant before distillation. Moreover, it is possible to recover alcohol denatured with pyridine, nicotine, or the alkaloids by the simple addition of excess sulphuric acid and distilling off the alcohol.

In the case of such denaturants as wood alcohol, acetone and isopropyl alcohol these denaturants are not removed in any of the above mentioned processes, so that in a recovered alcohol containing these substances they give no warning of their presence either by taste or odor that the alcohol is unfit for beverage use.

I have discovered that by treating alcohol with certain terpin compounds, preferably terpin hydrate, all of the above described methods of separation of pure alcohol are resisted and that the alcohol thus treated cannot be wholly freed by any known method from the terpin compounds.

In the preferred practice of the invention a suitable amount of terpin hydrate is dissolved in ethyl alcohol to which has been added, if desired, any known denaturant, such as the denaturants above referred to. In the case of 95 per cent ethyl alcohol from 2 to 5 per cent of terpin hydrate will be found to be satisfactory. In case the alcohol has been previously denatured with a direct denaturant the terpin hydrate is employed as an indicator or accessory to the denaturant.

The particular advantages of terpin hydrate are that this compound has a distinctive terpene taste without the objectionable odor of many of the terpene compounds. However, upon polymerization it is converted into terpin derivatives which have a decidedly objectionable odor by which they are readily recognized. This polymerization is readily brought about by various means subsequently to be described but particularly by the heat of distillation with the result that any redistilled alcohol is noticeably marked by this objectionable odor. Another advantage of the terpin hydrate is that it does not irritate the skin when applied as a rub. Moreover, in the small quantities in which it is employed it does not impart any color to the alcohol.

When alcohol so treated with terpin hydrate is distilled without the addition of any chemical, the terpin hydrate distills along with the alcohol to a considerable extent and in addition undergoes a decided decomposition into a much stronger smelling mixture of terpineol, dipentene and other derivatives as is well known when terpin hydrate is heated. The distillate therefore has a much stronger odor than the original alcohol. The distillate also has a decided terpene and bitter taste which readily indicates that the alcohol is not pure. This behavior is of decided value in identifying an alcohol denatured also with wood alcohol or acetone, isopropyl alcohol and other tasteless denaturants which distill unchanged with alcohol.

If alcohol containing terpin hydrate is treated with either acid or alkali to remove such other denaturants as alkaloids, esters, acids or phenols, the terpin hydrate again undergoes decomposition and the distillate though possibly free from the other denaturants is strongly odorous and tastes of the derivatives above mentioned.

If alcohol treated with terpin hydrate alone or with direct denaturants be treated with an immiscible solvent such as mineral oil, chloroform, carbon tetrachloride, kerosene, petroleum, ether, chlor ethanes, or the like either direct or after dilution with water, the terpin hydrate being more soluble in alcohol and also in a water alcohol mixture is not entirely removed by several washings with such immiscible solvents.

In addition to the advantages enumerated above the terpin hydrate does not react or otherwise chemically interfere with any of the direct denaturants now used in denatured alcohol formulas.

The use of terpin hydrate as an indicator or accessory to a denaturant in the manner described above permits the use of many direct denaturants for producing an objectionable taste but which could themselves be readily removed. But even if they are removed by any method which causes decomposition of terpin hydrate as by distillation at atmospheric pressure the terpene taste and odor due to the breaking up of the terpin hydrate during the recovery operation are readily recognizable in the recovered alcohol. It will be noted that this offers a means of tracing the origin of permitted alcoholic preparations.

While I prefer to use terpin hydrate as an indicator or an accessory to denaturant terpin itself (cis-terpin) may be employed with some measure of success. Also certain haloid, acid and nitrogenous substitution or addition products of terpin or terpin hydrate may be used with some measure of success. The above described indicator or accessory to a denaturant is not only advantageous for use in treating grain alcohol but also it may be added to alcohol-containing compositions such as hair tonics and rubbing formulæ. In these compositions it will be apparent that the indicator or accessory to a denaturant acts in the same way as in the case of alcohol.

It is to be understood that by the term "grain alcohol" as herein employed I refer to ethyl alcohol broadly without regard to the source from which it is produced.

While I have described in detail my preferred composition and the preferred practice of producing it, it is to be understood that the details of proceedure and proportions of ingredients may be widely varied, and that known chemical equivalents may be employed in place of the materials mentioned, without departing from the spirit of the invention or the scope of the subjoined claims.

I claim:—

1. A composition of the character described comprising ethyl alcohol, a terpin compound, and a different substance adapted to act as an alcohol denaturant.

2. A composition of the character described comprising ethyl alcohol, an alcohol denaturant, and terpin hydrate.

3. A composition of the character described comprising ethyl alcohol, terpin hydrate, and an alcohol denaturant adapted to be held back upon distillation of the composition by means of a non-neutral chemical.

4. A product of the character described comprising ethyl alcohol, terpin hydrate, and an alcohol denaturant, said denaturant comprising an alkaloid.

In testimony whereof I affix my signature.

EARL B. PUTT.